(12) United States Patent
Skjonnemand

(10) Patent No.: US 7,327,432 B2
(45) Date of Patent: Feb. 5, 2008

(54) OPTICALLY COMPENSATED ELECTRO-OPTICAL LIGHT MODULATION ELEMENT WITH OPTICALLY ISOTROPIC PHASE

(75) Inventor: Karl Skjonnemand, Southampton (GB)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 320 days.

(21) Appl. No.: 10/533,422

(22) PCT Filed: Oct. 24, 2003

(86) PCT No.: PCT/EP03/11845

§ 371 (c)(1),
(2), (4) Date: Apr. 29, 2005

(87) PCT Pub. No.: WO2004/042461

PCT Pub. Date: May 21, 2004

(65) Prior Publication Data

US 2006/0103917 A1    May 18, 2006

(30) Foreign Application Priority Data

Nov. 2, 2002    (EP)    ................................. 02024322

(51) Int. Cl.
G09K 19/02    (2006.01)
G02F 1/1335    (2006.01)

(52) U.S. Cl. .................... 349/168; 349/117; 349/118

(58) Field of Classification Search ............... 349/117, 349/118, 119, 168
See application file for complete search history.

(56) References Cited

U.S. PATENT DOCUMENTS

| 5,196,953 | A | * | 3/1993 | Yeh et al. ................... 349/119 |
| 5,504,603 | A | * | 4/1996 | Winker et al. .............. 349/117 |
| 5,598,285 | A |   | 1/1997 | Kondo et al. |
| 5,978,055 | A |   | 11/1999 | Van De Witte et al. |
| 6,144,434 | A |   | 11/2000 | Kim et al. |
| 6,266,109 | B1 |  | 7/2001 | Yamaguchi et al. |
| 2002/0150698 | A1 | * | 10/2002 | Kawabata ................... 428/1.1 |

FOREIGN PATENT DOCUMENTS

DE    102 17 273    12/2002
EP    0 588 568    3/1994

OTHER PUBLICATIONS

Yeh P et al: "Symmetry of Viewing Characteristics of Liquid Crystal Displays With Compensators" Displays, Elsevier Science Publishers BV., Barking, GB, vol. 21, No. 1, Mar. 2000, pp. 31-38.
Saitoh Y et al: "Optimum Film Compensation of Viewing Angle of Contrast in In-Plane-Switching-Mode Liquid Crystal Display" Japanese Journal of Applied Physics, Tokyo, JP, vol. 37, No. 9A, Sep. 1998, pp. 4822-4828.

* cited by examiner

*Primary Examiner*—James A. Dudek
(74) *Attorney, Agent, or Firm*—Millen, White, Zelano & Branigan, P.C.

(57) ABSTRACT

The invention relates to a compensated electro-optical light modulation element comprising a mesogenic medium that is operated in an optically isotropic phase of the mesogenic medium and comprising at least one compensation element, and to displays containing such a light modulation element.

19 Claims, 21 Drawing Sheets

(A)    (B)

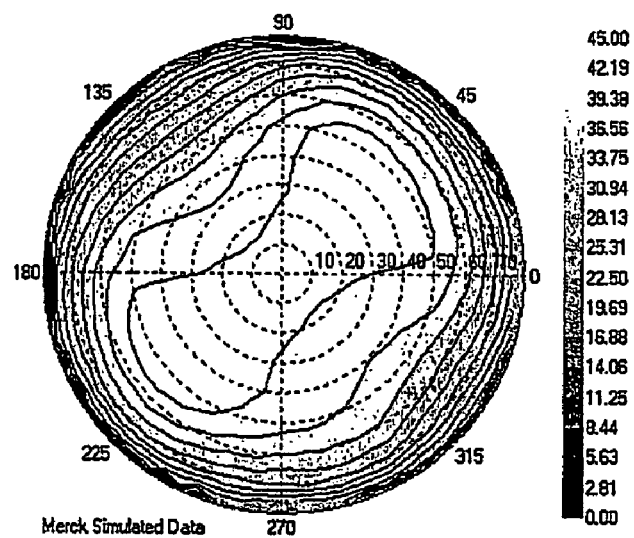
Fig    10A
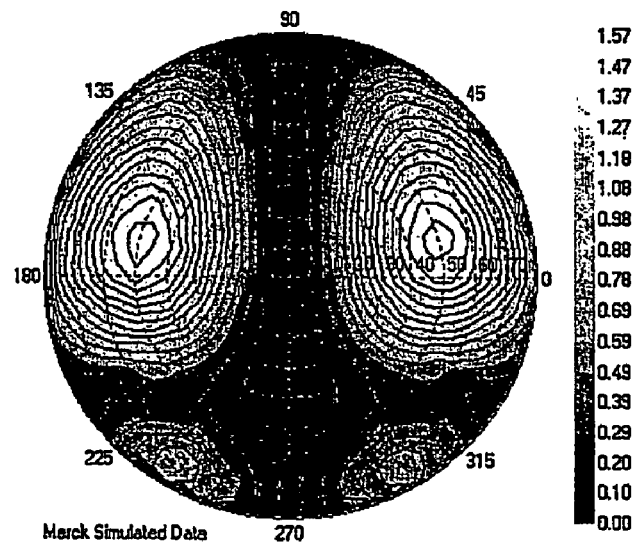
Fig    10B

OPTICALLY COMPENSATED ELECTRO-OPTICAL LIGHT MODULATION ELEMENT WITH OPTICALLY ISOTROPIC PHASE

FIELD OF THE INVENTION

The invention relates to a compensated electro-optical light modulation element comprising a mesogenic medium that is operated in an optically isotropic phase of the mesogenic medium and comprising at least one compensation element, and to displays containing such a light modulation element.

BACKGROUND AND PRIOR ART

The liquid-crystal display (LCD) devices typically used in prior art are for example TN (twisted nematic) LCDs, for example in accordance with Schadt, M. and Helfrich, W. Appl. Phys. Lett. 18, pp. 127 ff (1974) and in particular in their special form with low optical retardation d·Δn in the range from 150 nm to 600 nm in accordance with DE 30 22 818, STN (super twisted nematic) LCDs, such as, for example, in accordance with GB 2.123.163, Waters, C. M., Brimmel, V, and Raynes, E. Proc. $3^{rd}$ Int. Display Research Conference, Kobe 1983, pp. 396 ff and Proc. SID 25/4, pp. 261 ff, 1984, Scheffer, T. J. and Nehring, J. Appl. Phys. Lett. 45, pp. 1021 ff, 1984 and J. Appl. Phys. 58, pp. 3022 ff, 1985, DE 34 31 871, DE 36 08 911 and EP 0 260 450, IPS (in-plane switching) LCDs, as described, for example, in DE 40 00 451 and EP 0 588 568, and VA or VAN (vertically aligned nematic) LCDs, as described, for example, in Tanaka, Y. et al. Taniguchi, Y., Sasaki, T., Takeda, A., Koibe, Y., and Okamoto, K. SID 99 Digest pp. 206 ff (1999), Koma, N., Noritake, K., Kawabe, M., and Yoneda, K., International Display Workshop (IDW) '97 pp. 789 ff (1997) and Kim, K. H., Lee, K., Park, S. B., Song, J. K., Kim, S., and Suk, J. H., Asia Display 98, pp. 383 ff, (1998).

In LCD devices which were known hitherto and are for the most part already commercially available, the optical appearance is inadequate, at least for demanding applications. In particular the contrast, especially in the case of coloured displays, the brightness, the colour saturation and the viewing-angle dependence of these parameters are in clear need of improvement and have to be improved if the display devices are to compete with the performance features of the widespread CRTs (cathode ray tubes). Further disadvantages of the LCD devices of prior art are often their poor spatial resolution and inadequate response times, in particular in the case of STN, but also in the case of TN or IPS and VA LCDs, in the case of the latter especially if they are to be used for the reproduction of video, such as, for example, in multimedia applications on computer display screens or in the case of television sets. Particularly for this purpose, but also even for the display of rapid cursor movements, short response times are desired.

Recently a new type of LCDs and LC devices has been reported in prior art. These devices are disclosed for example in WO 02/93244 A1, DE 10217273 A1, DE 102 41 301 or DE 103 139 79, and are hereinafter also referred to as ISP (isotropic switching panel) mode or device. They comprise an electro-optical light modulating element containing an electrically switchable mesogenic or liquid crystal (LC) medium that is operated in an optically isotropic phase, like for example in the isotropic phase (i.e. at a temperature above the clearing point of the LC medium) or, more preferably, in a blue phase. The mesogenic or LC medium in the optically isotropic phase becomes birefringent when an electric field is applied. Interdigitated electrodes on one side of the light modulation element create an in-plane electric field parallel to the plane of the element, which aligns the mesogenic or LC molecules in a planar texture along the electric field lines. A typical light modulation element of this type is schematically illustrated in FIG. 1, wherein 11 is a layer of an LC medium, 12 and 13 are linear polarisers, 14 are the electrodes and 15 depicts the electric field lines. FIG. 1A shows the element in its driven, light state where the LC material is in its liquid crystal phase. FIG. 1B shows the element in its undriven, dark state, where the LC material is in an optically isotropic phase, preferably in a blue phase. The field-induced birefringence of the LC layer retards the incident linearly polarised light, enabling it to pass through the second polariser. The optics of the light state can be approximated to that of a planar aligned LC between crossed polarisers. Although the regions directly above the electrodes are homeotropic, the majority of the LC is planar aligned. The optics of the dark state is that of an optically isotropic medium between crossed polarisers.

ISP LCDs, details on their assembly and suitable components and LC media to be used therein are described in WO 02/93244 A1, DE 10217273 A1, DE 102 41 301 and DE 103 139 79, the entire disclosure of which is incorporated into this application by reference.

ISP LCDs are suitable, inter alia, as display screens of television sets, computers, such as, for example, notebook computers or desktop computers, central control units and of other equipment, for example gambling machines, electro-optical displays, such as displays of watches, pocket calculators, electronic (pocket) games, portable data banks, such as PDAs (personal digital assistants) or of mobile telephones.

However, LCDs of the ISP mode often show a limited viewing angle performance. For example, in a typical ISP mode display as shown in FIG. 1, in specific directions the dark state often exhibits light leakage which results in contrast reduction. In addition, the light state luminance is often reduced and colouration can occur. Also, the contrast is often limited which is a disadvantage especially in large area applications such as television.

The inventors of the present invention have found that the properties of ISP LCDs, especially the viewing angle characteristics, can be further improved by using a compensator comprising one or more retardation films of specific types and in specific arrangements as described in the following invention. In particular, this invention relates to optical films which can be applied to ISP LCDs to improve the viewing angle in terms of dark state luminance (and hence contrast) and surprisingly, the white-state luminance and colour.

One aim of the present invention is to provide a compensator for a light modulation element or display of the ISP mode with improved optical performance. The compensator should preferably be easy to manufacture and allow economic fabrication even at large scales.

Another aim of this invention is to provide an advantageous use of the compensator according to this invention.

Another aim of this invention is to provide a light modulation element or display of the ISP mode comprising an inventive compensator which shows advantageous properties such as good contrast, reduced colour shift and wide viewing angles.

Other aims of the present invention are immediately evident to the person skilled in the art from the following detailed description.

The above aims can be achieved by providing compensators, light modulation elements and displays according to the present invention as described above and below.

DEFINITION OF TERMS

In connection with polarisation, compensation and retardation layers, films or plates as described in the present application, the following definitions of terms as used throughout this application are given.

The term 'film' includes self-supporting, i.e. free-standing, films or layers of material that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. Liquid crystal (LC) compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

For the sake of simplicity, the term 'liquid crystal material' is used for both liquid crystal materials and mesogenic materials, and the term 'mesogen' is used for the mesogenic groups of the material.

The term 'director' means the preferred orientation direction of the long molecular axes in case of calamitic compounds, or of the short molecular axis in case of discotic compounds, of the mesogens in a liquid crystal material.

The term 'planar structure' or 'planar orientation' refers to a layer of optically anisotropic material wherein the optical axis is substantially parallel to the plane of the layer.

The term 'homeotropic structure' or 'homeotropic orientation' refers to a layer of optically anisotropic material wherein the optical axis is substantially perpendicular to the plane of the layer.

The terms 'tilted structure' or 'tilted orientation' refers to a layer of optically anisotropic material wherein the optical axis is tilted at an angle θ between 0 and 90 degrees relative to the plane of the layer.

The term 'splayed structure' or 'splayed orientation' means a tilted orientation as defined above, wherein the tilt angle within the layer varies monotonuously in the range from 0 to 90°, preferably from a minimum to a maximum value, in a direction perpendicular to the plane of the layer.

Unless stated otherwise, the tilt angle of a splayed layer is given as the average tilt angle $\theta_{ave}$ which is defined as $$\theta_{ave} = \frac{\sum_{d'=0}^{d} \theta'(d')}{d}$$

wherein θ'(d') is the local tilt angle at the thickness d' within the layer, and d is the total layer thickness.

In planar, homeotropic and tilted optical films or layers comprising uniaxially positive birefringent liquid crystal material with uniform orientation, the direction of the optical axis is given by the director of the liquid crystal material.

The term 'uniaxial' refers to a material, film or layer having three principal refractive indices in directions orthogonal to each other, wherein two refractive indices are identical and the third refractive index is different from the other two refractive indices, resulting in a single, unique optic axis.

The term 'biaxial' refers to a material, film or layer having three principal refractive indices in directions orthogonal to each other, wherein the three refractive indices are different, resulting in two optic axes.

The term 'A plate' refers to an optical retarder utilizing a layer of birefringent material with its optical axis oriented parallel to the plane of the layer.

The term 'twisted A plate' refers to an A plate comprising molecular sublayers, each having an optical axis that is defined by an azimuthal or twist angle measured relative to a reference axis in the plane of the layer, wherein said azimuthal or twist angle varies monotonuously in a direction perpendicular to the layer.

The term 'C plate' refers to an optical retarder utilizing a layer of birefringent material with its optical axis perpendicular to the plane of the layer.

The term 'O plate' refers to an optical retarder utilizing a layer of birefringent material with its optical axis oriented at an oblique angle with respect to the plane of the layer.

The terms 'tilted O plate' and 'splayed O plate' refer to an O plate having tilted or splayed structure, respectively, as defined above.

In A-, C- and O-plates comprising optically uniaxial birefringent liquid crystal material with uniform orientation, the direction of the optical axis is usually identical to the direction of the extraordinary axis.

An A-, C- or O-plate comprising optically uniaxial birefringent material with positive birefringence is also referred to as '+A/C/O plate' or 'positive A/C/O plate'. An A-, C- or O-plate comprising optically uniaxial birefringent material with negative birefringence is also referred to as '−A/C/O plate' or 'negative A/C/O plate'.

A retardation film with positive or negative birefringence is also referred to as 'positive' or 'negative' retardation film, respectively.

SUMMARY OF THE INVENTION

The present invention relates to an electro-optical light modulation element comprising an electrode arrangement, at least one element for polarisation of the light, and a mesogenic modulation medium, said light modulation element being operated at a temperature at which the mesogenic modulation medium in the unaddressed state is in an optically isotropic phase, characterized in that it comprises at least one compensation element comprising at least one birefringent polymer film.

The invention further relates to an electro-optical light modulation element comprising an electrode arrangement, at least one element for polarisation of the light, and a mesogenic modulation medium, said light modulation element being operated at a temperature at which the mesogenic modulation medium in the unaddressed state is in an optically isotropic phase, characterized in that it comprises at least one compensation element comprising a) at least one optical retardation layer having an optical axis that is substantially parallel to the plane of the layer and to the surface of the mesogenic modulation medium, and/or b) at least one optical retardation layer having an optical axis that is substantially perpendicular to the plane of the layer and to the surface of the mesogenic modulation medium, and/or c) at least one optical retardation layer having an optical axis that is tilted at an angle θ between 0° and 90° relative to the plane of the layer and to the surface of the mesogenic modulation medium and/or d) at least one optical biaxial retardation layer.

The invention further relates to an electro-optical display comprising one or more light modulation elements as described above and below.

The invention further relates to an optical compensation element for use in a light modulation element or display as described above and below comprising at least one birefringent polymer film or comprising at least one layer a) and/or at least one layer b) and/or at least one layer c) and/or at least one layer d) as described above and below.

The invention further relates to the use of a light modulation element or display as described above and below for the display of information or of video signals, as monitor like for example television or computer monitor, or for projection systems.

BRIEF DESCRIPTION OF DRAWINGS

FIGS. 10A, 10B, 10C and 10D show a light state luminance, dark state luminance, isocontrast plot and light state colour shift, respectively.

DETAILED DESCRIPTION OF THE INVENTION

Figure 1:
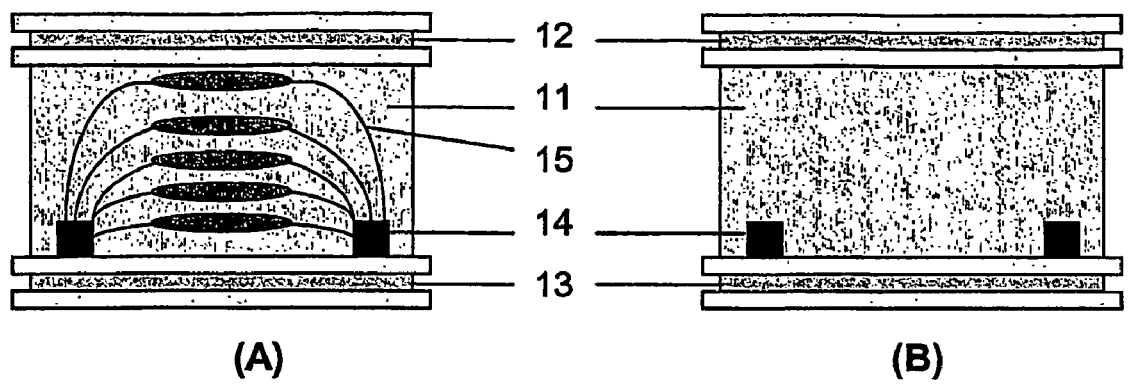
FIG. 1 shows an uncompensated display of the ISP mode.

The light modulation element or display according to the present invention is operated at a temperature where the mesogenic modulation medium is in an optically isotropic phase, like for example the blue phase or the isotropic phase.

In a preferred embodiment of the present invention the light modulation element or display is operated in the isotropic phase of the mesogenic modulation medium, i.e. at a temperature above the clearing temperature of the medium.

In a preferred embodiment of the present invention the light modulation element or display is operated in the blue phase, or one of the blue phases, of the mesogenic modulation medium.

Preferably the electrode arrangement in the light modulation element or display according to the present invention is able to generate an electric field having a significant component parallel to the surface of the mesogenic modulation medium.

Very preferably the electrode arrangement during operation of the light modulation element generates an electric field having a significant component parallel to the plane of the mesogenic modulation medium.

Preferably the electrode arrangement is located on one side of the layer of the mesogenic modulation medium.

Preferably the light modulation element or display further comprises two elements for polarisation of the light, preferably linear polarisers, sandwiching the mesogenic modulation medium, so that light during passage through the light modulation element in each case passes through at least one polariser before passing through the mesogenic modulation medium and after passing through the mesogenic modulation medium.

In another preferred embodiment of the present invention the light modulation element or display is a multidomain display, very preferably comprising at least two domains wherein the preferred orientation directions of the molecules in the mesogenic modulating medium are parallel to the plane of the medium and orthogonal to each other. Preferably said preferred orientation directions form an angle of 45° to the polariser orientations. Such compensated and uncompensated dual domain or multi domain elements and displays have especially improved white state luminance and colour.

Preferably the light modulation element or display comprises a liquid crystal medium. The mesogenic or liquid crystal medium preferably has a nematic or smectic, very preferably a nematic phase.

The optical performance of the light modulation element or display according to the present invention is improved by the use of an optical compensation element as described above and below, hereinafter referred to as compensator.

The use of the compensator in the light modulation element or display especially leads to better viewing angle characteristics, like good contrast and high level stability at wide viewing angles and reduced colour shift. Furthermore, it is possible to improve the viewing angle of in terms of dark state luminance (and hence contrast) and white-state luminance and colour.

The compensator comprises one or more retardation layers which can be for example compensation or retardation films comprising a birefringent material in its solid state, like for example birefringent polymer films. It is also possible to use as compensation element for example a layer of a birefringent mesogenic or liquid crystal medium comprising low molecular weight compounds, which is preferably confined between two transparent substrates and aligned into uniform orientation.

Especially preferred is a compensator comprising a retardation or compensation layer or film comprising birefringent polymer material.

Further preferred is a compensator comprising a retardation or compensation layer or film comprising polymerised or crosslinked mesogenic or liquid crystal (LC) material. As the optical retardation of a birefringent layer is defined as the product d·Δn of the layer thickness d and the birefringence Δn, the use of LC materials with high birefringence allows to reduce the layer thickness, or, at constant layer thickness, to increase the optical retardation. Furthermore, by appropriate choice of the LC material of the retardation layer its optical properties can be adapted to those of the LC material in the light modulation element or display, which allows improved compensation.

In a preferred embodiment of the present invention the compensator comprises at least one layer a) comprising one or more retardation films having an optical axis that is substantially parallel to the film plane, hereinafter also referred to as A plate.

The A plate can be a positive A plate, wherein the refractive index in the direction parallel to the optical axis is larger than in directions perpendicular to the optical axis, or a negative A plate, wherein the refractive index in the direction parallel to the optical axis is smaller than in directions perpendicular to the optical axis.

Especially preferably the compensator comprises at least one positive A plate.

The optical axis of the A plate is preferably parallel to the transmission axis of the adjacent polariser.

Suitable optical films for use as A plate are known in prior art, like for example uniaxially stretched polymer films such as polyethyleneterephthalate (PET), polyvinylalcohol (PVA) or polycarbonate (PC) films.

The A plate preferably comprises polymerised LC material with planar structure as described for example in WO 98/04651, the entire disclosure of which is incorporated by reference.

In another preferred embodiment the compensator comprises at least one layer b) comprising one or more retardation films having an optical axis that is substantially perpendicular to the film plane, hereinafter also referred to as C plate.

The C plate can be a positive C plate, wherein the refractive index in the direction parallel to the optical axis is larger than in directions perpendicular to the optical axis, or a negative C plate, wherein the refractive index in the direction parallel to the optical axis is smaller than in directions perpendicular to the optical axis.

Especially preferably the compensator comprises at least one positive C plate.

As positive C plate preferably a film is used that comprises polymerised LC material with homeotropic structure, as described for example in WO 98/00475, the entire disclosure of which is incorporated into this application by reference.

Suitable optical films for use as negative C plate are known in prior art, like for example stretched or uniaxially compressed plastic films like DAC or TAC as described for example in U.S. Pat. No. 4,701,028, inorganic thin films obtained by physical vapour deposition as described for example in U.S. Pat. No. 5,196,953, or negatively birefringent polyimide films as described for example in U.S. Pat. No. 5,480,964 and U.S. Pat. No. 5,395,918.

As negative C plate preferably a film is used that comprises polymerised chiral LC, in particular cholesteric LC (CLC) material having a cholesteric helix axis substantially perpendicular to the film plane and having a short pitch and a reflection in the UV range, like for example a UVCLC film or highly twisted A plate as described in GB 2,315,072 and WO 01/20394, the entire disclosure of which is incorporated into this application by reference. A UVCLC film as described in these documents does not have the same structure as a conventional negative C plate with an extraordinary axis oriented perpendicular to the film plane, but nevertheless has the same optical properties as a negative C plate.

In another preferred embodiment the compensator comprises at least one layer c) comprising one or more retardation films having an optical axis that is tilted at an angle θ between 0° and 90° relative to the film plane, hereinafter also referred to as O plate. Especially preferred are positive O plates. The O plate can have a tilt angle that is substantially constant throughout the film, or a tilt angle that varies monotonuously in a direction normal to the film plane, the latter of which is also known as splayed O plate.

Especially preferred are splayed O plates.

In another preferred embodiment the compensator comprises two splayed O plate layers with the average tilt of both layers being in the same plane and having opposing direction. This embodiment is illustrated in FIGS. 2A and 2B and relates to two splayed layers 21 and 22 wherein the optical axes 23 and 24 in different parts of both layers are in the same plane and the tilt angle θ, when looking at the layers in side view and when going from low values to high values of θ, has opposite sense of variation, i.e. clockwise and counterclockwise respectively, in the two layers.

Figure 2:
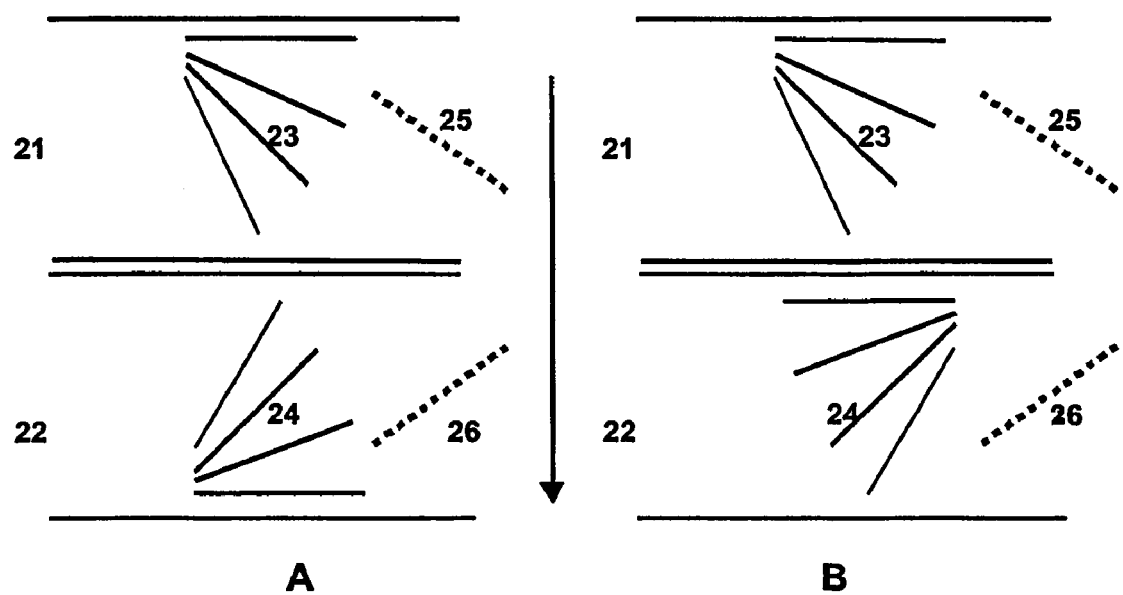
FIGS. 2A and 2B a preferred embodiment is illustrated.
Figure 3A:
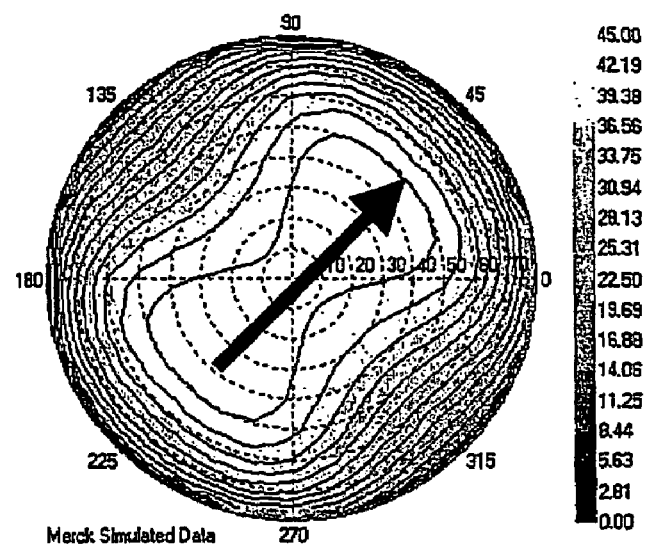
FIGS. 3A, 3B, 3C and 3D show a light state luminance, dark state luminance, isocontrast plot and light state colour shift, respectively.
Figure 3B:
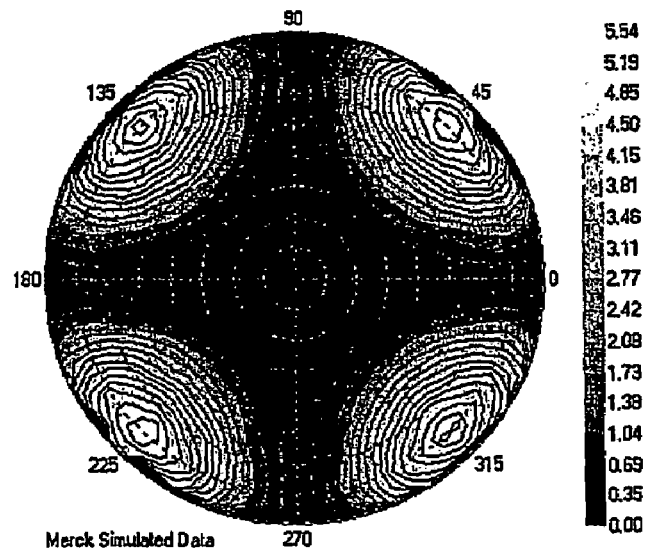
Figure 3C:
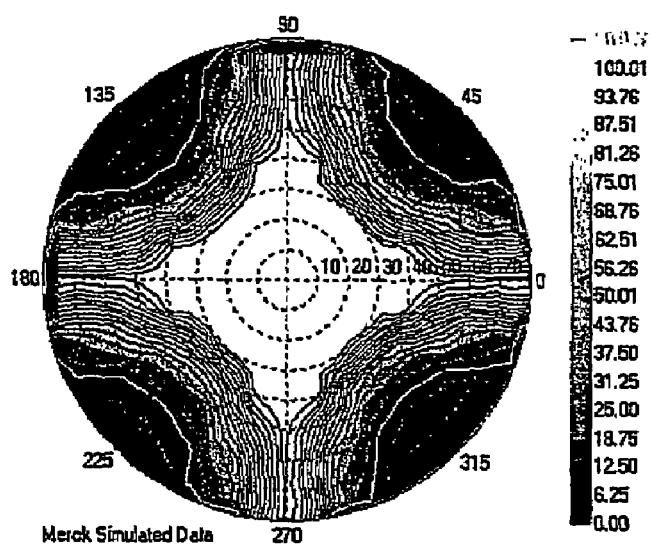
Figure 3D:
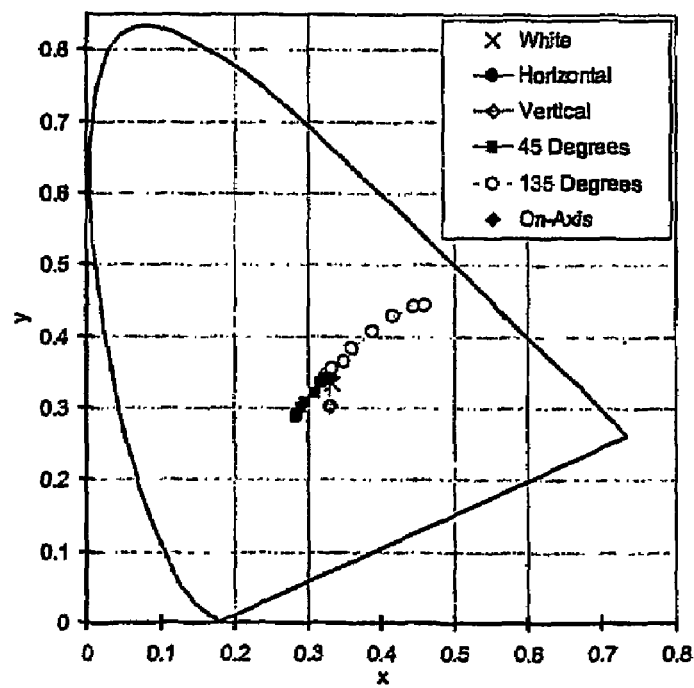
Figure 4A:
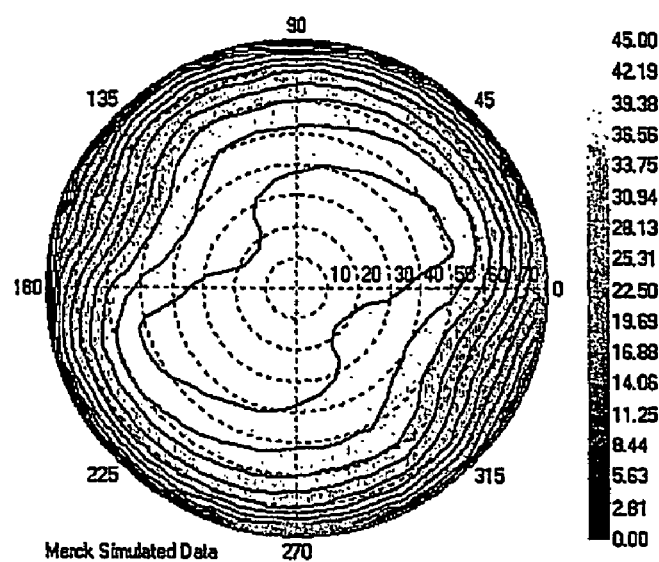
FIGS. 4A, 4B, 4C and 4D show a light state luminance, dark state luminance, isocontrast plot and light state colour shift, respectively.
Figure 4B:
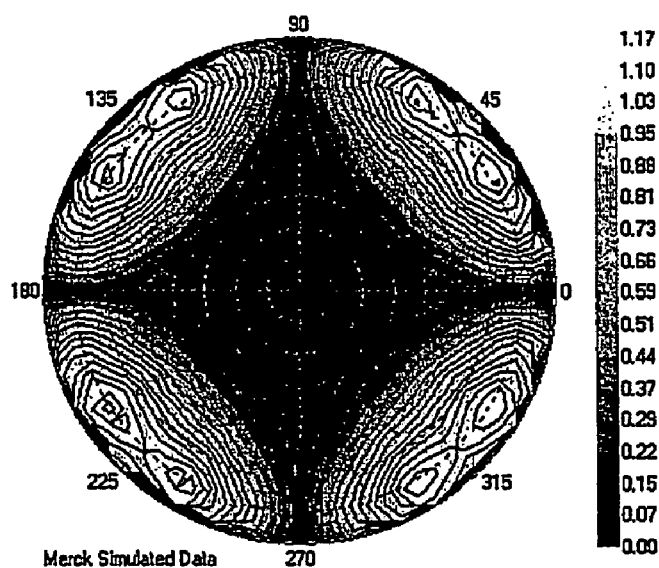
Figure 4C:
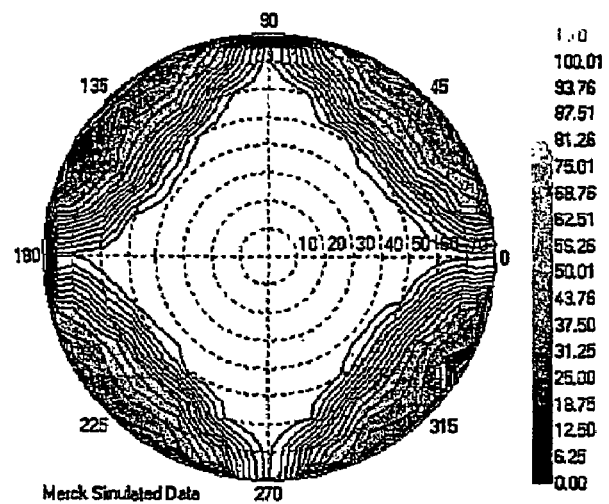
Figure 4D:
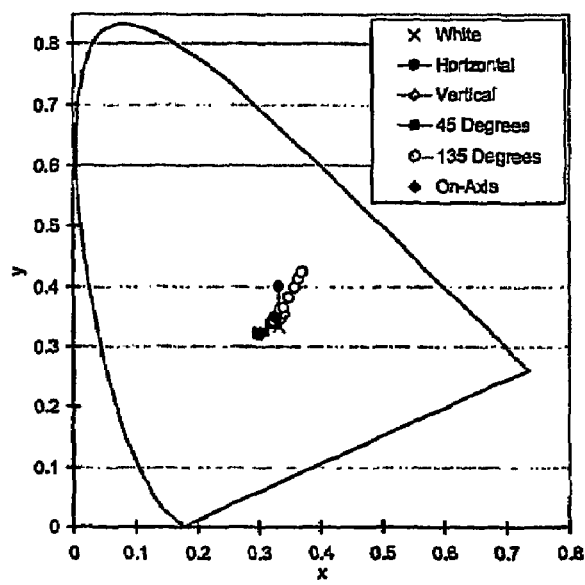
Figure 5A:
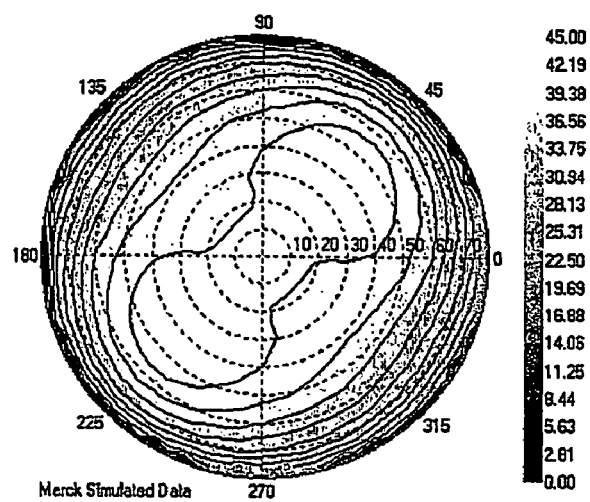
FIGS. 5A, 5B, 5C and 5D show a light state luminance, dark state luminance, isocontrast plot and light state colour shift, respectively.
Figure 5B:
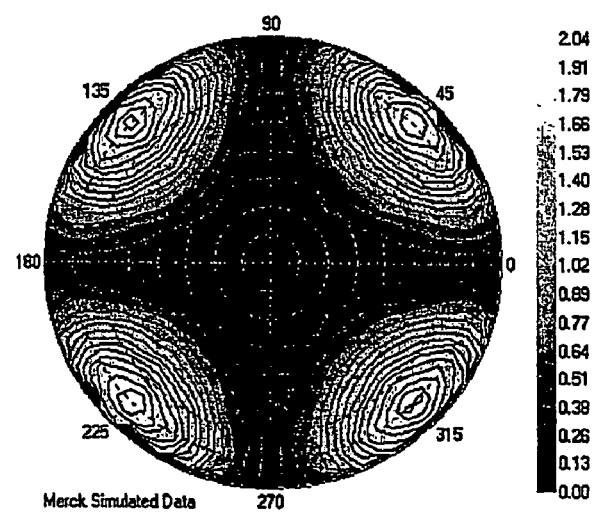
Figure 5C:
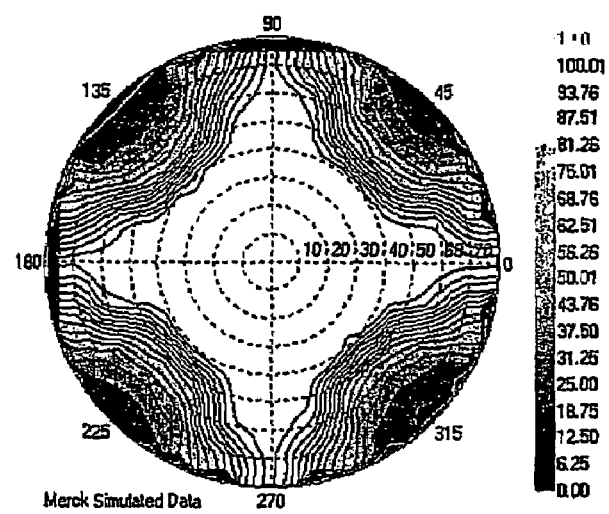
Figure 5D:
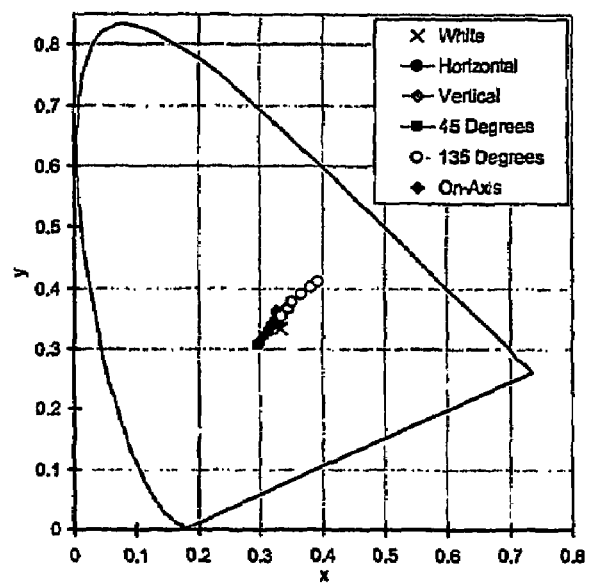
Figure 6A:
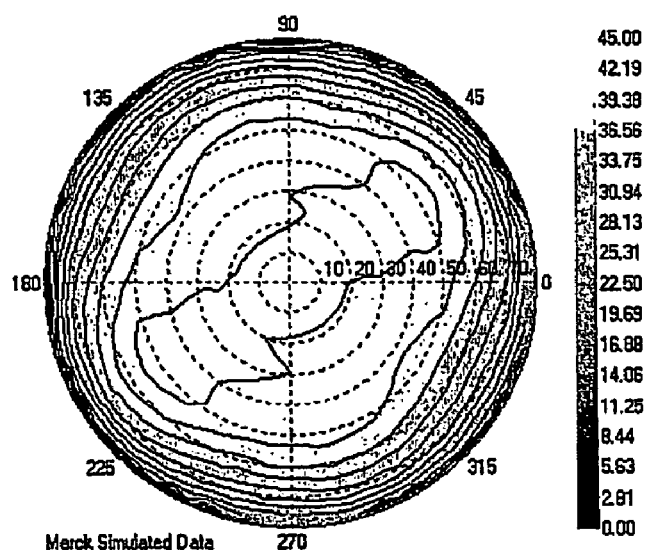
FIGS. 6A, 6B, 6C and 6D show a light state luminance, dark state luminance, isocontrast plot and light state colour shift, respectively.
Figure 6B:
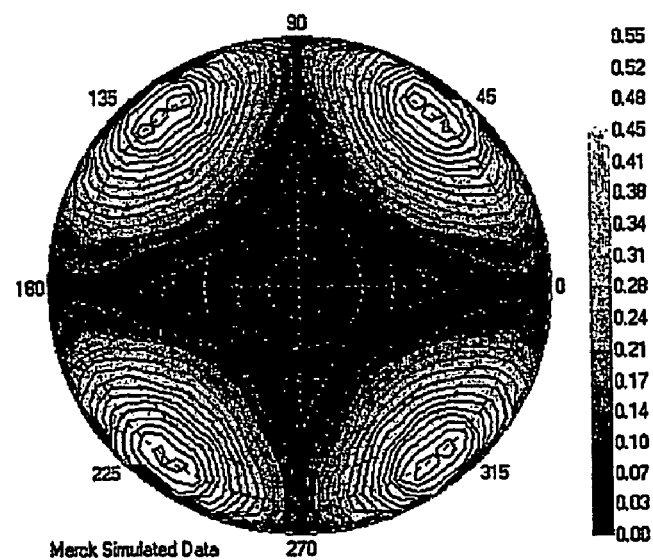
Figure 6C:
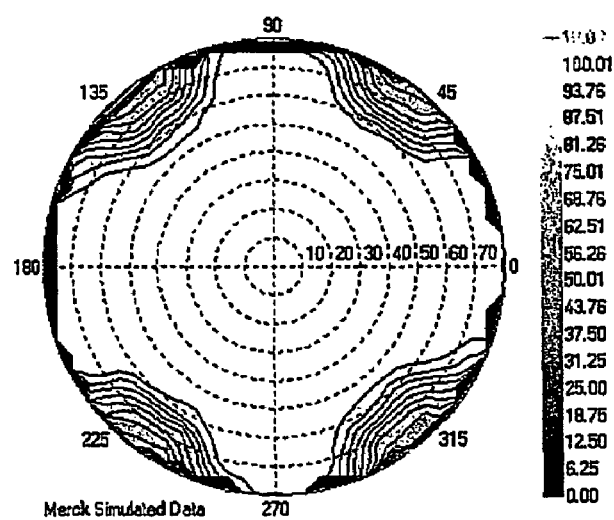
Figure 6D:
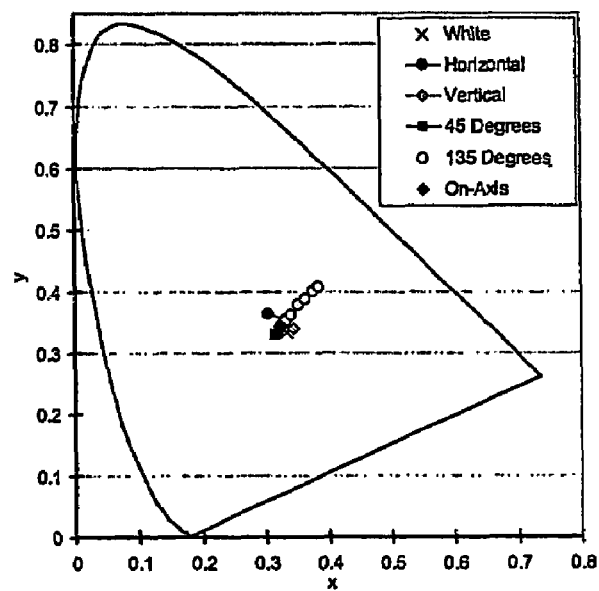
Figure 7A:
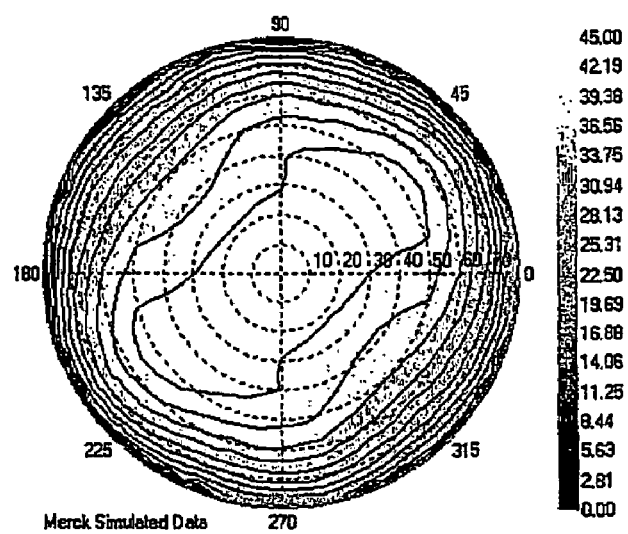
FIGS. 7A, 7B, 7C and 7D show a light state luminance, dark state luminance, isocontrast plot and light state colour shift, respectively.
Figure 7B:
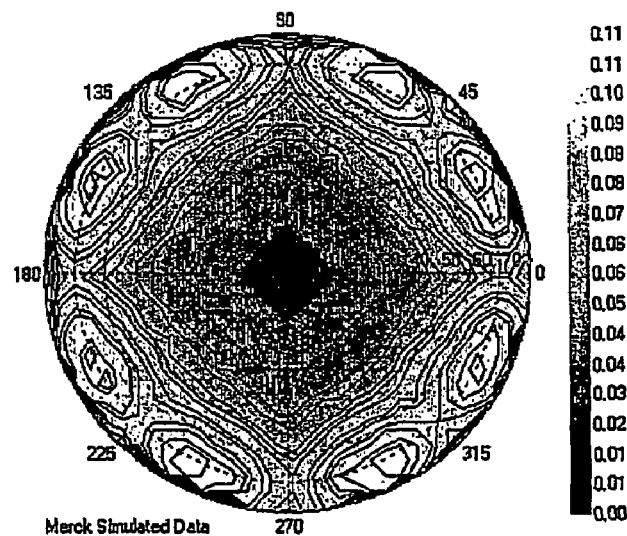
Figure 7C:
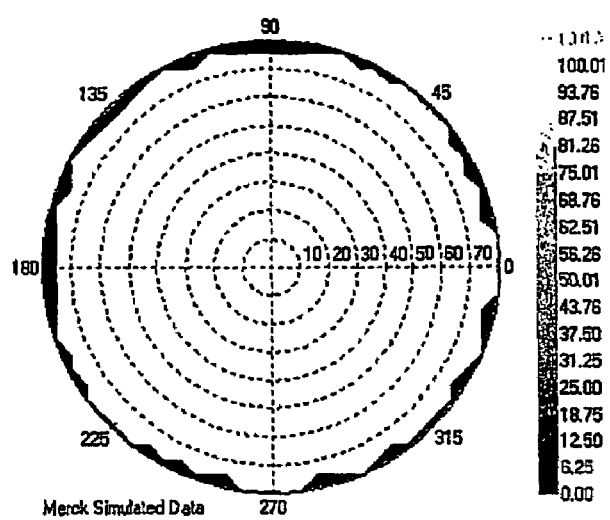
Figure 7D:
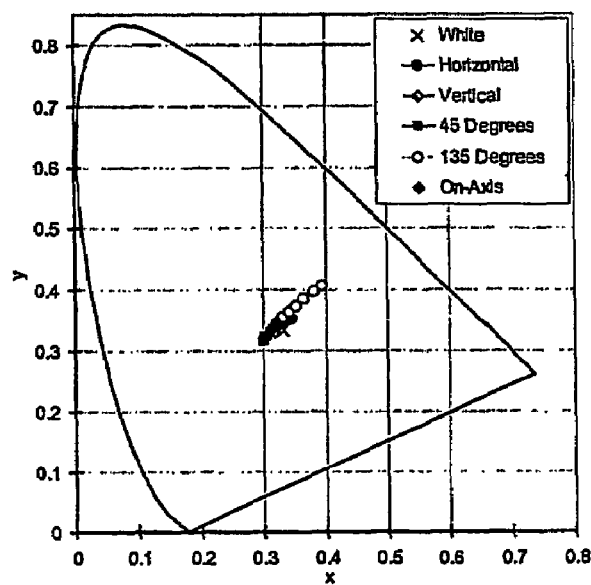
Figure 8A:
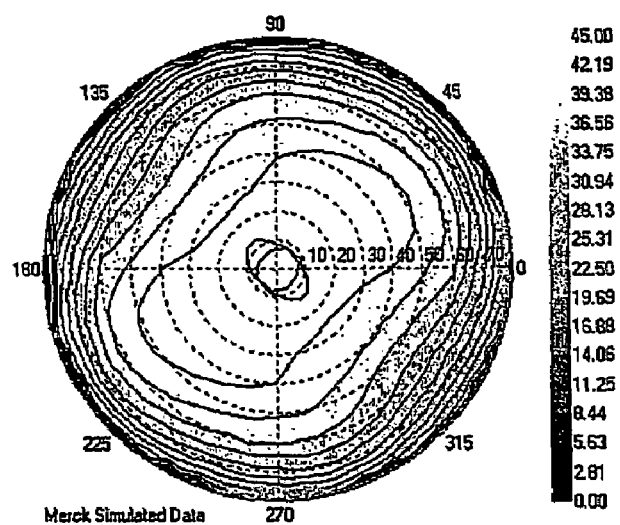
FIGS. 8A, 8B, 8C and 8D show a light state luminance, dark state luminance, isocontrast plot and light state colour shift, respectively.
Figure 8B:
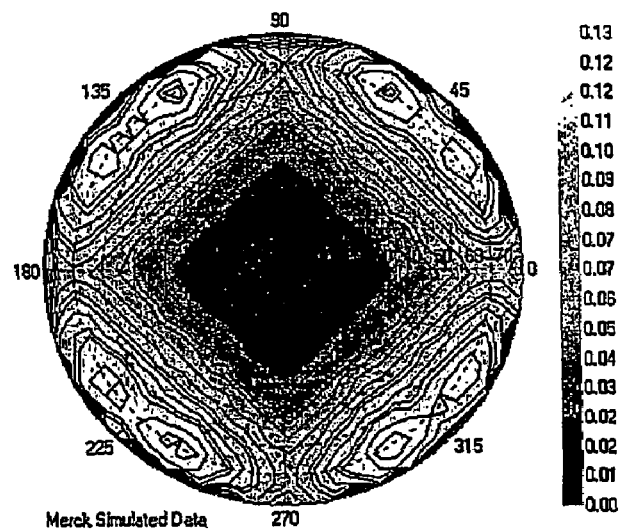
Figure 8C:
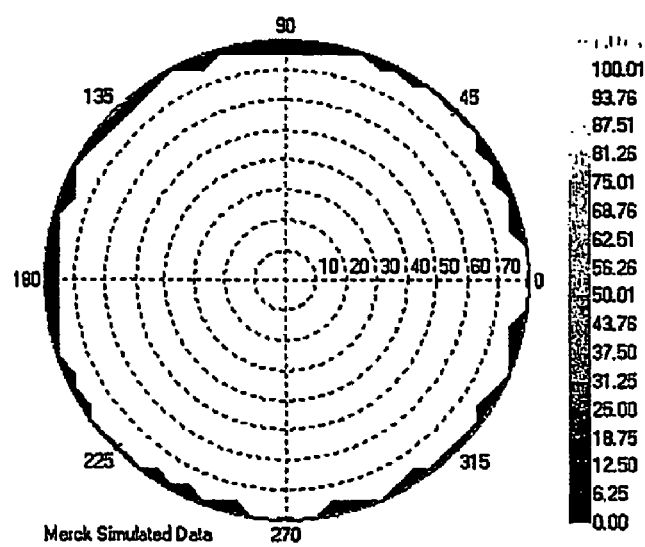
Figure 8D:
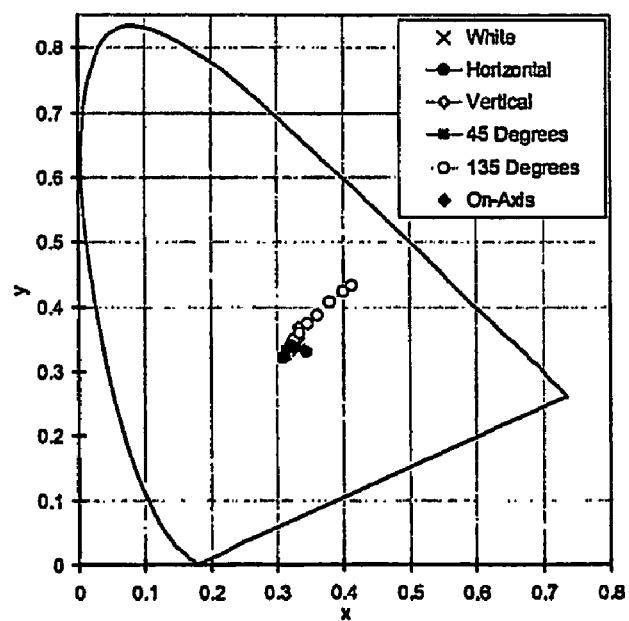
Figure 9A:
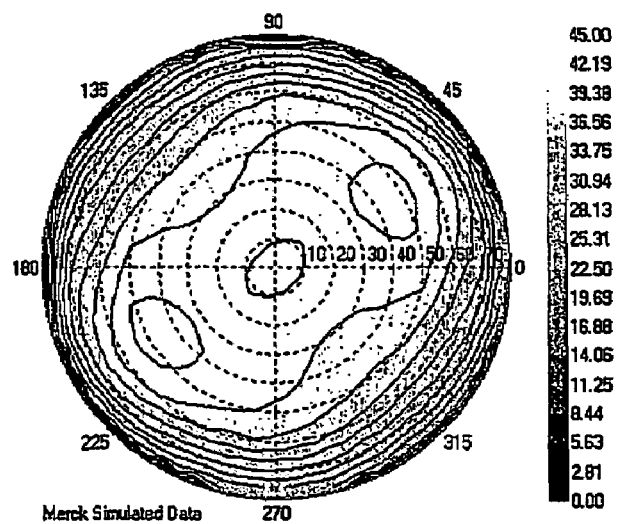
FIGS. 9A, 9B, 9C and 9D show a light state luminance, dark state luminance, isocontrast plot and light state colour shift, respectively.
Figure 9B:
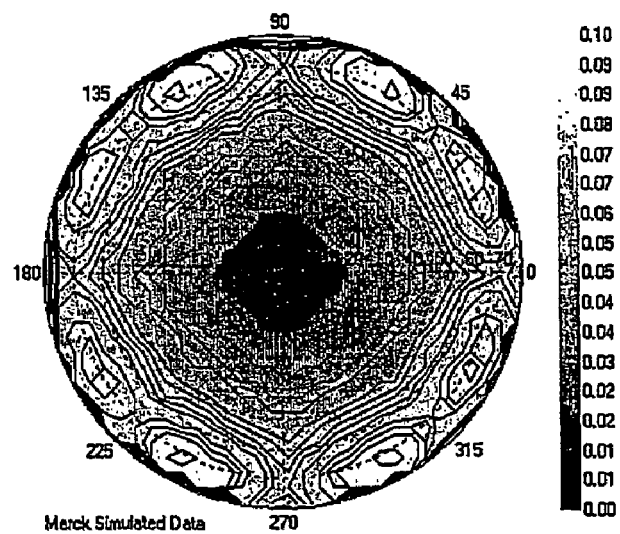
Figure 9C:
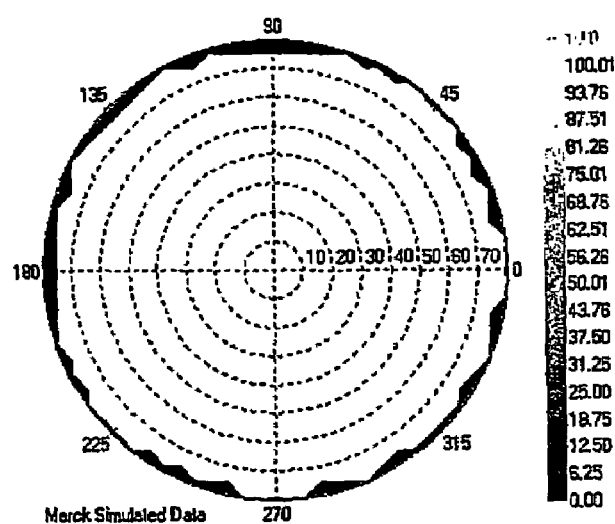
Figure 9D:
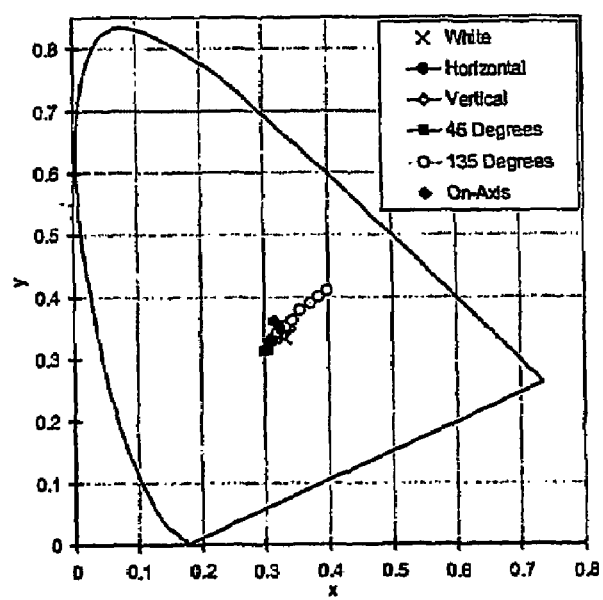
Figure 10C:
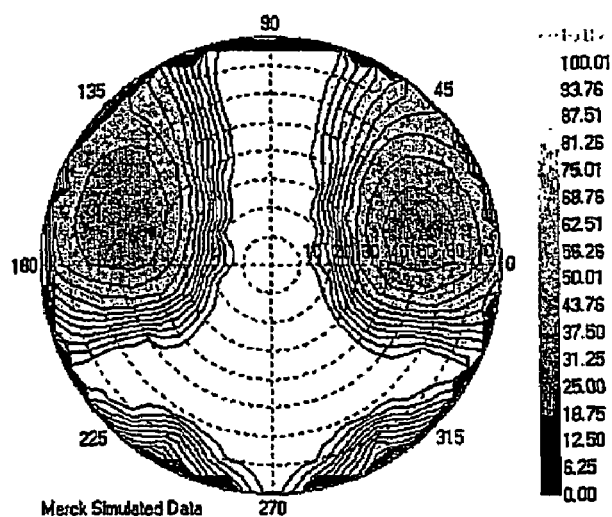
Figure 10D:
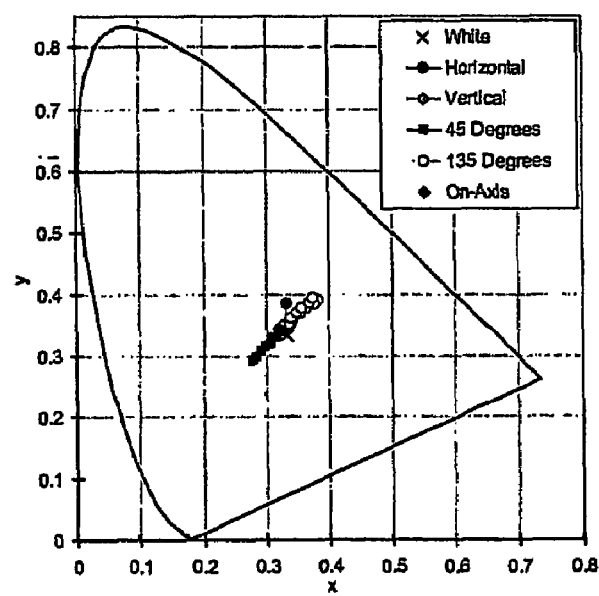
Figure 11A:
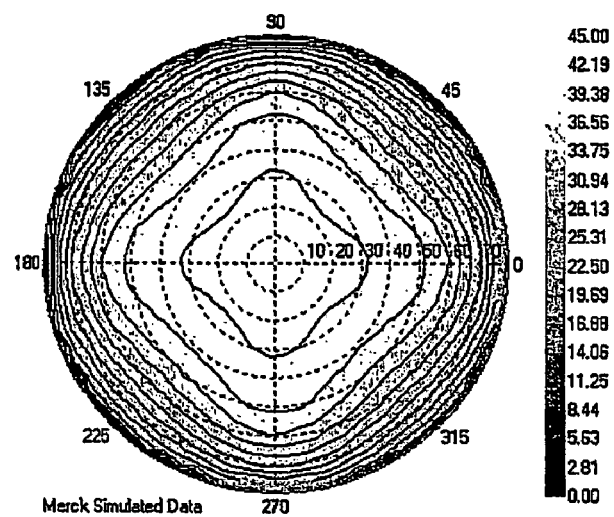
FIGS. 11A, 11B, 11C and 11D show a light state luminance, dark state luminance, isocontrast plot and light state colour shift, respectively.
Figure 11B:
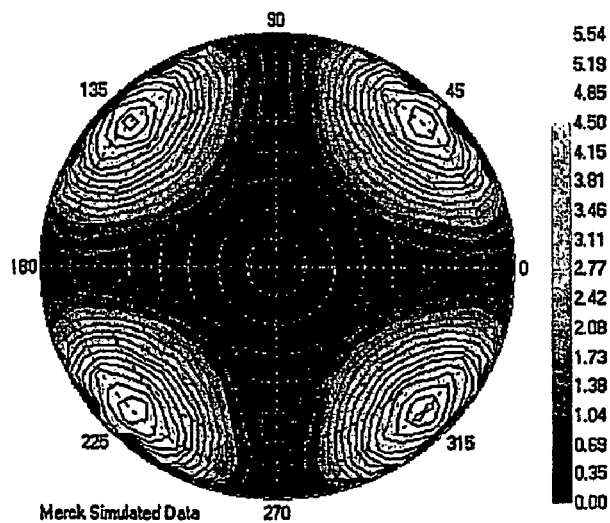
Figure 11C:
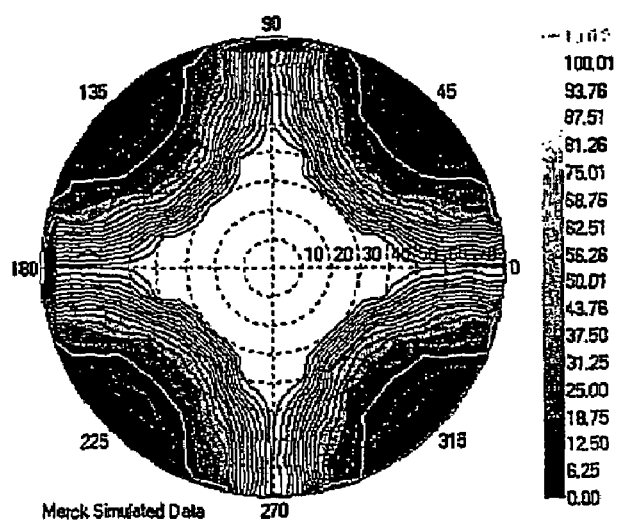
Figure 11D:
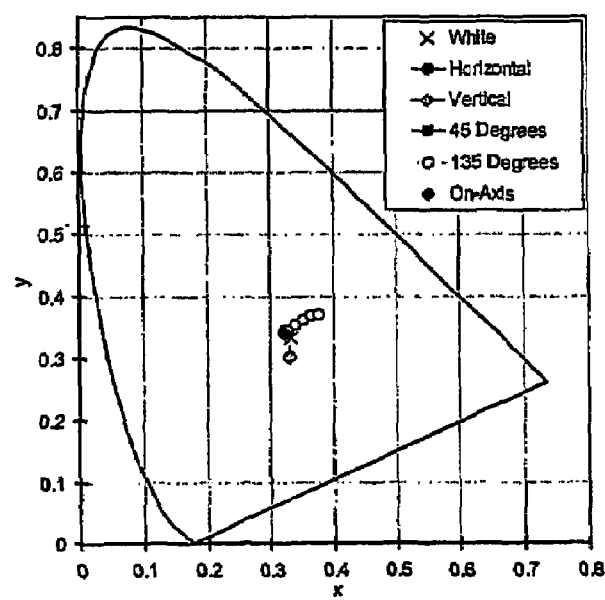
Figure 12A:
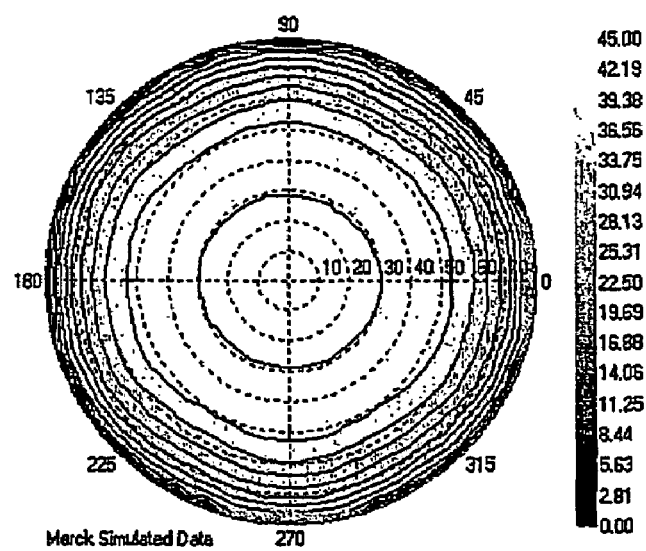
FIGS. 12A, 12B, 12C and 12D show a light state luminance, dark state luminance, isocontrast plot and light state colour shift, respectively.
Figure 12B:
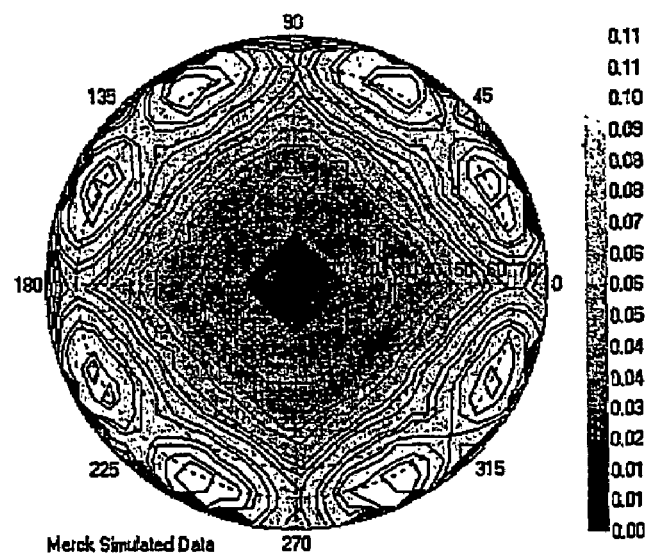
Figure 12C:
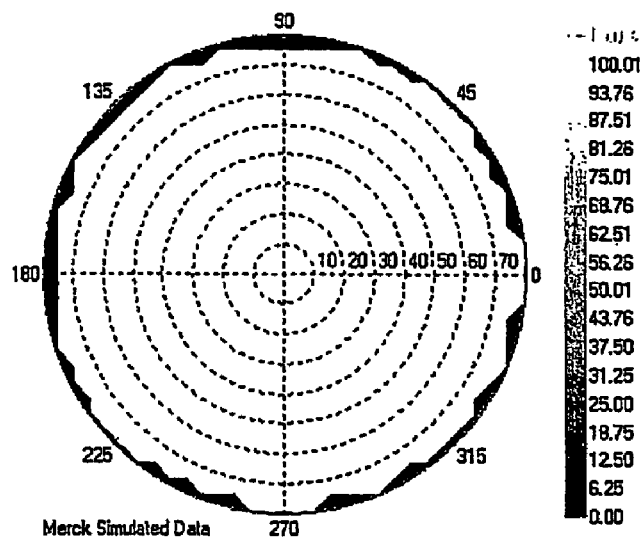
Figure 12D:
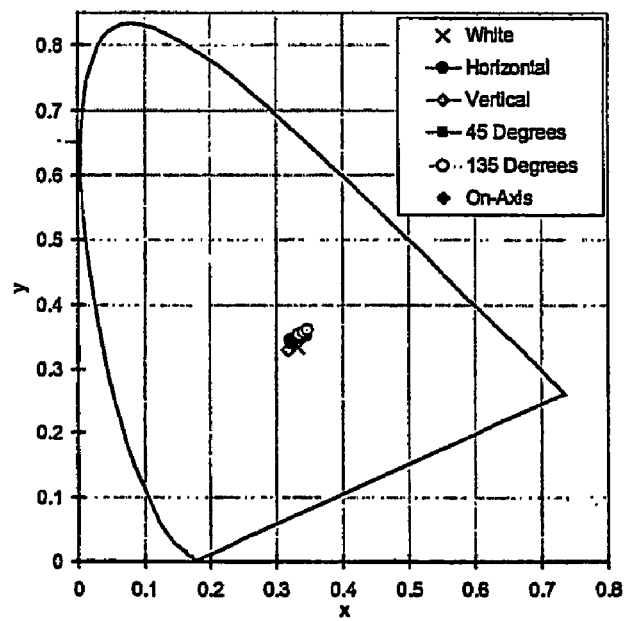

Especially preferred are the specific arrangements shown in FIGS. 2A and 2B.

The arrow in FIGS. 2A and 2B indicates the preferred direction of light from the backlight to the viewer.

In case the two splayed layers in the embodiment as illustrated in FIGS. 2A and 2B have the same average tilt angle and the same minimum and maximum tilt, the directions 25 and 26 of average tilt in the two layers show mirror symmetry.

Preferably the projection of the optical axis of the O plate to the plane of the film is parallel to the direction of either of the polariser transmission directions.

Preferably the two splayed O plates have the same average tilt angle, very preferably the same average tilt angle and the same minimum and maximum tilt angle.

In another preferred embodiment the compensator comprises two negative O plates which can be tilted or splayed.

Suitable films for use as O plate retarders are known in prior art, and can be obtained for example by oblique vapour deposition of a thin film, e.g. of an inorganic material such as $Ta_2O_5$, as described for example in U.S. Pat. No. 5,196, 953 and WO 96/10773. It is also possible to use as O plate an LC film as described in WO 96/10770, which is prepared from a polymerisable LC material with a smectic A or C phase and a nematic phase at higher temperatures, by applying the LC material in its nematic phase onto a substrate optionally covered with an alignment layer of obliquely deposited SiO, lowering the temperature into the smectic C phase of the material so that the LC material adopts its naturally tilted smectic C structure, and fixing the tilted structure by polymerisation of the LC material.

The tilted or splayed O plate preferably comprises a polymerised LC material with tilted or splayed structure, as described for example in U.S. Pat. No. 5,619,352, WO 97/44409, WO 97/44702, WO 97/44703 or WO 98/12584, the entire disclosure of which is incorporated by reference.

In another preferred embodiment the compensator comprises at least one layer d) comprising one or more retardation films having three different refractive indices in directions perpendicular to each other, hereinafter also referred to as biaxial film.

Preferably the biaxial film has $n_x \neq n_y \neq n_z$ and $n_y > n_z > n_x$ wherein $n_x$ and $n_y$ are the principal refractive indices in orthogonal directions in the film plane and $n_z$ is the principal refractive index perpendicular to the film plane.

Preferably the direction of $n_x$ or $n_y$ is parallel to either of the polarisers transmission direction.

Further suitable biaxial films are for example biaxially stretched or side-stretched polymer films.

The single retardation films in a compensator, light modulation element or display according to the present invention can be laminated directly onto each other or onto the other optical components, or separated by transparent intermediate films, like for example TAC, DAC or PVA films or by adhesive layers like for example pressure sensitive adhesives (PSA) which are commercially available.

The polarising elements are preferably linear polarisers, very preferably standard dichroic polarisers. Such films are known in prior art and are commercially available. It is also possible to use linear polarisers comprising polymerised liquid crystal material with planar orientation.

Especially preferred is a compensator, light modulation element or display comprising
  at least one, preferably one positive A plate,
  at least one, preferably one negative A plate,
  at least one, preferably one positive C plate,
  at least one, preferably one positive A plate and at least one, preferably one positive C plate, which can be located on the sam side or on opposite sides of the modulating medium,
  at least one, preferably one O plate,
  at least two, preferably two O plates, very preferably two splayed O plates, most preferably two splayed O plates oriented anti-parallel to each other, preferably located on opposite sides of the modulating medium,
  at least one, preferably one biaxial film,
  an element or display comprising two or more, preferably two biaxial films, preferably located on opposite sides of the modulating medium,
  an A plate and/or C plate and/or O plate and/or biaxial film comprising polymerised or crosslinked LC material.

Table 1 shows especially preferred compensator stacks in a light modulation element or display according to the present invention. Therein, P denotes a polarising element, LC denotes a switchable LC cell of the ISP mode comprising the electrodes and the mesogenic or liquid crystal medium, A denotes an A plate, C denotes a C plate, Bi denotes a biaxial film, TAC denotes a TAC film. "+" and "−" denote positive and negative retarders. Brackets indicate an element that can also be omitted. Unless stated otherwise, the direction of incident light is from left to right.

TABLE 1

| 1) P | (TAC) | +A | LC | (TAC) | P | | |
|---|---|---|---|---|---|---|---|
| 2) P | (TAC) | LC | +A | (TAC) | P | | |
| 3) P | (TAC) | +C | LC | (TAC) | P | | |
| 4) P | (TAC) | LC | +C | (TAC) | P | | |
| 5) P | (TAC) | −A | LC | (TAC) | P | | |
| 6) P | (TAC) | LC | −A | (TAC) | P | | |
| 7) P | (TAC) | +C | LC | +A | (TAC) | P | |

TABLE 1-continued

| 8) P | (TAC) | +A | LC | +C | (TAC) | P |
|---|---|---|---|---|---|---|
| 9) P | (TAC) | +A | +C | LC | (TAC) | P |
| 10) P | (TAC) | LC | +C | +A | (TAC) | P |
| 11) P | (TAC) | Bi | LC | (TAC) | P | |
| 12) P | (TAC) | LC | Bi | (TAC) | P | |
| 13) P | (TAC) | Bi | LC | Bi | (TAC) | P |
| 14) P | (TAC) | O → | LC | ← O | (TAC) | P |

The compensator, light modulation element or display according to the present invention may further comprise one or more further optical components such as polarisers or compensation or retardation films, like for example one or more quarter wave retardation films (QWF, λ/4 films) or half wave retardation films (HWF, λ/2 films), positive or negative A, O or C plates or retardation films with twisted, homeotropic, planar, tilted or splayed structure. Particularly preferred are optical films comprising polymerised or crosslinked LC material.

The light modulation element or display according to the present invention may be a reflective or transmissive device, and may further comprise a light source, like a conventional backlight, or a reflective layer on the side of the modulating medium opposite to that of the first linear polariser. In case of a reflective display with a reflective layer on one side of the modulating medium the second linear polariser may be omitted.

The retardation films like the A plate, C plate, O plate and biaxial retarders in the compensator, light modulation element or display according to the present invention preferably comprise polymerised or crosslinked LC material. The polymerised LC material can comprise calamitic or discotic liquid crystal compounds. Suitable calamitic materials are described for example in WO 98/04651, WO 98/00475, WO 01/20394, WO 98/12584. Suitable discotic materials are described for example in U.S. Pat. No. 5,730,900 and U.S. Pat. No. 5,635,105.

The polymerised LC material can comprise LC moieties or LC compounds as part of the polymer main chain or as part of the polymer side chain.

The retardation films are preferably prepared from a polymerisable LC material by in-situ polymerisation. In a preferred method of preparation the polymerisable LC material is coated onto a substrate, oriented into the desired orientation and subsequently polymerised for example by exposure to heat or actinic radiation as described for example in WO 01/20394, GB 2,315,072 or WO 98/04651.

Alternatively it is possible to prepare the retardation films from a readily synthesized LC polymer that is applied onto a substrate, for example at a temperature above its glass transition temperature or its melting point, or from solution e.g. in an organic solvent, aligned into the desired orientation, and solidified for example by evaporating the solvent or by cooling below the glass temperature or melting point of the LC polymer. If for example a LC polymer with a glass temperature that is higher than ambient temperature is used, evaporation of the solvent or cooling leaves a solid LC polymer film. If for example an LC polymer with a high melting point is used, the LC polymer can be applied as a melt onto the substrate which solidifies upon cooling. LC side chain polymers or LC main chain polymers can be used, preferably LC side chain polymers. The LC polymer should preferably be selected such that its glass transition or melting temperature is significantly higher than the operating tempature of the retarder. For example, LC side chain polymers comprising a polyacrylate, polymethacrylate, polysiloxane, polystyrene or epoxide backbone with laterally attached mesogenic side chains can be used. The LC polymer may also comprise side chains with reactive groups that can be crosslinked after or during evaporation of the solvent to permanently fix the orientation. The LC polymer may also be subjected to mechanical or heat treatment after application to the substrate to improve alignment. Suitable LC polymers for this method are known to the ordinary expert.

Further suitable methods and materials for the preparation of retardation films are known to those skilled in the art.

The examples below serve to illustrate the invention without limiting it. Therein, the following abbreviations are used:

$n_x$, $n_y$ principal refractive indices in orthogonal directions in the film plane
$n_z$ principal refractive index perpendicular to the film plane
$\Delta n$ birefringence
d layer thickness [μm]
d×Δn optical retardation [nm]

Unless stated otherwise, values of n are given for 20° C. and 550 nm.

The uncompensated and compensated displays described in the following examples, unless explicitly stated otherwise, contain the following components:

| LC cell | |
|---|---|
| ISP mode LC cell with the following cell parameters | |
| Cell gap d = | 6400 nm |
| Δn (550 nm) = | 0.036 (light state), 0.000 (dark state) |
| Light State = | Planar Aligned LC at 45° |
| Dark State = | Optically Isotropic |
| Polarisers = | Aligned at 0° and 90° |
| TAC $(n_x - n_y) \cdot d$ = | 2.3 nm |
| TAC $(n_y - n_z) \cdot d$ = | 53 nm |
| Phi = | Angle from normal to the cell plane |
| Theta = | Azimuthal angle within the cell plane |

Polarisers

Standard type stretched dichroic polarisers, the stretch axis being indicated in the Figures by double headed arrows.

All the following examples include TAC layers in the polarisers, which act as slightly biaxial −C retarders. These can be removed from the stack and by appropriately combining the TAC retardation with the compensators, a good viewing angle can be maintained.

The display configurations of the following examples also contain a light source, like for example a backlight on the left side of the display (not shown in the Figure).

The values and plots of the iso-contrast and grey levels in the following examples are obtained by modelling or measurement, respectively, using berreman matrix methods for optical simulations and Eldim EZContrast equipment for viewing angle measurement.

EXAMPLE 1 (COMPARATIVE EXAMPLE)

Uncompensated Display

An uncompensated display of the ISP mode as shown in FIG. 1 comprises an LC cell and two polarisers as defined above.

The light state luminance, dark state luminance, isocontrast plot and light state colour shift are shown in FIGS. 3A, 3B, 3C and 3D, respectively. The orientation of the LC director in the LO medium is depicted by the arrow in FIG. 3A.

The dark state exhibits light leakage in the 45° directions, which results in contrast reduction. In addition, the light state luminance is reduced and colouration occurs in the direction perpendicular to the LC director. The 10:1 contrast region only extends to 60° in the 45° directions, making this uncompensated mode unsuitable for large area applications such as television.

EXAMPLE 2

+A Plate Compensation

A compensated display according to stack (1) in table 1 wherein both TAC films are present.
+A-plate: d·Δn=340 nm
+A-plate orientation: theta=90°, phi=90°

The light state luminance, dark state luminance, isocontrast plot and light state colour shift are shown in FIGS. 4A, 4B, 4C and 4D, respectively.

EXAMPLE 3

+C Plate Compensation

A compensated display according to stack (4) in table 1 wherein both TAC films are present.
+C-plate: d·Δn=124 nm
+C-plate orientation: theta=0°

The light state luminance, dark state luminance, isocontrast plot and light state colour shift are shown in FIGS. 5A, 5B, 5C and 5D, respectively.

EXAMPLE 4

−A Plate Compensation

A compensated display according to stack (6) in table 1 wherein both TAC films are present.
−A-plate: d·|Δn|=194 nm
−A-plate orientation: theta=90°, phi=90°

The light state luminance, dark state luminance, isocontrast plot and light state colour shift are shown in FIGS. 6A, 6B, 6C and 6D, respectively.

EXAMPLE 5

+A Plate & +C Plate Compensation

A compensated display according to stack (7) in table 1 wherein both TAC films are present.
+A-plate: d·Δn=85 nm
+A-plate orientation: theta=90°, phi=90°
+C-plate: d·Δn=179 nm
+C-plate orientation: theta=0°

The light state luminance, dark state luminance, isocontrast plot and light state colour shift are shown in FIGS. 7A, 7B, 7C and 7D, respectively.

EXAMPLE 6

Biaxial Compensation

A compensated display according to stack (12) in table 1 wherein both TAC films are present.
Biaxial Film: d·$(n_y-n_x)$=269 nm
  d·$(n_z-n_y)$=−121 nm
Orientation: theta=0°, phi=0°

The light state luminance, dark state luminance, isocontrast plot and light state colour shift are shown in FIGS. 8A, 8B, 8C and 8D, respectively.

EXAMPLE 7

Dual Biaxial Compensation

A compensated display according to stack (13) in table 1 wherein both TAC films are present. Biaxial film 1 is on the left side, biaxial film 2 on the right side of the LC cell.
Biaxial Film 1: theta=0°, phi=0°
  $d \cdot (n_y - n_x) = 116$ nm
  $d \cdot (n_z - n_y) = -146$ nm
Biaxial Film 2: theta=90°, phi=0°
  $d \cdot (n_y - n_x) = -59$ nm
  $d \cdot (n_z - n_y) = 40$ nm The light state luminance, dark state luminance, isocontrast plot and light state colour shift are shown in FIGS. 9A, 9B, 9C and 9D, respectively.

EXAMPLE 8

Dual Splayed +O-Plate Compensation

A compensated display according to stack (14) in table 1 wherein both TAC films are present. The splay configuration of the two O-plates is as shown in FIG. 2A.
Splayed +O-plate 1: Lower surface: theta=86°, phi=0°
  Upper surface: theta=15°, phi=0°
  On axis: $d \cdot \Delta n = 119$ nm
Splayed +O-plate 2: Lower surface: theta=15°, phi=0°
  Upper surface: theta=86°, phi=0°
  On axis: $d \cdot \Delta n = 119$ nm The light state luminance, dark state luminance, isocontrast plot and light state colour shift are shown in FIGS. 10A, 10B, 10C and 10D, respectively.

EXAMPLE 9 (COMPARATIVE EXAMPLE)

Uncompensated Dual Perpendicular Domains

An uncompensated ISP mode display with two domains wherein the preferred orientation direction of the LC molecules within the cell plane is is 0° and 90°, respectively, when an electric field is applied.

The light state luminance, dark state luminance, isocontrast plot and light state colour shift are shown in FIGS. 11A, 11B, 11C and 11D, respectively.

EXAMPLE 10

Dual Perpendicular Domains with +A-plate & +C-Plate Compensation

A compensated ISP mode display with two domains wherein the preferred orientation direction of the LC molecules within the cell plane is is 0° and 90°, respectively, when an electric field is applied, according to stack (7) in table 1 wherein both TAC films are present.
+A-plate: $d \cdot \Delta n = 85$ nm
+A-plate orientation: theta=90°, phi=90°
+C-plate: $d \cdot \Delta n = 179$ nm
+C-plate orientation: theta=0°

The light state luminance, dark state luminance, isocontrast plot and light state colour shift are shown in FIGS. 12A, 12B, 12C and 12D, respectively.

Examples 2-8 show that an excellent dark state over all viewing angles can be achieved by the use of appropriate compensation films. This results in a theoretical greater than 100:1 contrast in all viewing directions. Application of compensation films also has the surprising effect that the off-axis luminance in the white state is improved as well as the off-axis chromaticity.

Examples 8 and 9 show the effect of a two domain white state. The two domains have perpendicular LC directors that lie 45° and 135° relative to the polarisers. This preferred cell configuration, especially when compensated, achieves superior light-state colour and improved luminance at wide viewing angles.

The invention claimed is:

1. An electro-optical light modulation element comprising an electrode arrangement,
at least one element for polarization of light, and
a mesogenic modulation medium,
said light modulation element being operated at a temperature at which the mesogenic modulation medium in the unaddressed state is in a blue phase,
at least one optical compensation element comprising at least one birefringent polymer film.

2. An electro-optical light modulation element comprising an electrode arrangement,
at least one element for polarization of light, and
a mesogenic modulation medium,
said light modulation element being operated at a temperature at which the mesogenic modulation medium in the unaddressed state is in a blue phase,
at least one optical compensation element comprising
a) at least one optical retardation layer having an optical axis that is substantially parallel to the plane of the layer and to the surface of the mesogenic modulation medium, and/or
b) at least one retardation layer having an optical axis that is substantially perpendicular to the plane of the layer and to the surface of the mesogenic modulation medium, and/or
c) at least one retardation layer having an optical axis that is tilted at an angle θ of between 0° and 90° relative to the plane of the layer and to the surface of the mesogenic modulation medium, and/or
d) at least one optical biaxial retardation layer.

3. An electro-optical light modulation element according to claim 1, wherein the electrode arrangement is located on one side of the layer of the mesogenic modulation medium and during operation of the light modulation element generates an electric field having a significant component parallel to the plane of the mesogenic modulation medium.

4. An electro-optical light modulation element according to claim 1, wherein the light during passage through the light modulation element in each case passes through at least one polarizer before passing through the mesogenic modulation medium and after passing through the mesogenic modulation medium.

5. An electro-optical light modulation element according to claim 1, comprising at least two domains wherein the preferred orientation directions of the molecules in the mesogenic modulating medium are parallel to the plane of the medium and orthogonal to each other.

6. An electro-optical light modulation element according to claim 1, wherein the mesogenic modulation medium has a nematic liquid crystal phase.

7. An electro-optical light modulation element according to claim 2, wherein in said compensation element at least one of the optical retardation layers a) and/or b) and/or c) and/or d) is a birefringent polymer film.

8. An electro-optical light modulation element according to claim 1, wherein in said compensation element the birefringent polymer film or at least one of the optical retardation layers a) and/or b) and/or c) and/or d) comprises polymerized or crosslinked LC material.

9. An electro-optical light modulation element according to claim 2, wherein said compensation element comprises at least one layer a) comprising at least one positive A plate retardation film.

10. An electro-optical light modulation element according to claim 2, wherein said compensation element comprises at least one layer a) comprising at least one negative A plate retardation film.

11. An electro-optical light modulation element according to claim 2, wherein said compensation element comprises at least one layer b) comprising at least one positive C plate retardation film.

12. An electro-optical light modulation element according to claim 2, wherein said compensation element comprises at least one layer c) comprising at least one positive O plate retardation film.

13. An electro-optical light modulation element according to claim 2, wherein said compensation element comprises at least one layer d) comprising at least one biaxial retardation film.

14. An electro-optical light modulation element according to claim 2, wherein said compensation element comprises at least layer a) comprising at least one positive A plate retardation film and at least one layer b) comprising at least one positive C plate retardation film.

15. An electro-optical light modulation element according to claim 2, wherein said compensation element comprises at least two layers c) comprising at least one positive splayed O plate retardation film with the average tilt of both layers being in the same plane and having opposing direction.

16. An electro-optical light modulation element according to claim 2, wherein said compensation element comprises at least two layers d) comprising at least one biaxial retardation film.

17. An electro-optical display comprising one or more light modulation elements according to claim 1.

18. A television or computer monitor, or projection system, comprising one or more light modulation elements according to claim 1.

19. An electro-optical display comprising one or more light modulation elements according to claim 2.

* * * * *